(12) United States Patent
Boehm et al.

(10) Patent No.: US 12,008,384 B2
(45) Date of Patent: Jun. 11, 2024

(54) PROCESS-ORIENTED APPLICATION CONFIGURATION THROUGH SEMANTIC MAPPING

(71) Applicant: SAP SE, Walldorf (DE)

(72) Inventors: Markus Boehm, Ludwigshafen (DE); Jan Aalmink, Kronau (DE)

(73) Assignee: SAP SE, Walldorf (DE)

( * ) Notice: Subject to any disclaimer, the term of this patent is extended or adjusted under 35 U.S.C. 154(b) by 400 days.

(21) Appl. No.: 17/220,765

(22) Filed: Apr. 1, 2021

(65) Prior Publication Data
US 2022/0318027 A1  Oct. 6, 2022

(51) Int. Cl.
| | |
|---|---|
| G06F 1/24 | (2006.01) |
| G06F 9/00 | (2006.01) |
| G06F 9/445 | (2018.01) |
| G06F 16/22 | (2019.01) |
| G06F 16/28 | (2019.01) |
| G06F 16/901 | (2019.01) |

(52) U.S. Cl.
CPC ...... *G06F 9/44505* (2013.01); *G06F 16/2282* (2019.01); *G06F 16/284* (2019.01); *G06F 16/9024* (2019.01)

(58) Field of Classification Search
CPC ............. G06F 9/44505; G06F 16/2282; G06F 16/284; G06F 16/9024; G06Q 10/06315
See application file for complete search history.

(56) References Cited

U.S. PATENT DOCUMENTS

| | | | | |
|---|---|---|---|---|
| 5,625,809 | A * | 4/1997 | Dysart | G06F 9/543 |
| 9,558,265 | B1 * | 1/2017 | Tacchi | G06F 16/338 |
| 2006/0143057 | A1 * | 6/2006 | Sadiq | G06Q 10/06 |
| | | | | 705/7.26 |
| 2010/0318963 | A1 * | 12/2010 | Kajiya | G06F 8/30 |
| | | | | 717/119 |
| 2021/0064418 | A1 * | 3/2021 | Natarajan | G06F 9/54 |
| 2021/0089524 | A1 * | 3/2021 | Benanav | G06F 16/24526 |
| 2022/0253334 | A1 * | 8/2022 | Nakamura | G06F 9/4881 |

* cited by examiner

*Primary Examiner* — Xuxing Chen
(74) *Attorney, Agent, or Firm* — Klarquist Sparkman, LLP

(57) ABSTRACT

Systems, methods, and computer media are described for process-oriented application configuring using semantic mapping. Desired application processes can be identified by a user, and a semantic map can be generated linking the application processes, and components of processes, to corresponding configuration objects that are used to implement the processes in the application. Configuration objects can be settings, objects, functions, user interface features, executables, etc. The semantic map thus bridges between the process-oriented view of an application and the functional, implementation-oriented view of the application. The applications can then be configured using the configuration objects identified and linked by the semantic map.

17 Claims, 6 Drawing Sheets

PROCESS-ORIENTED APPLICATION CONFIGURATION THROUGH SEMANTIC MAPPING

BACKGROUND

Software applications are increasingly used by entities to manage activities and data. Different entities and industries often have different needs and requirements, and customizing applications for specific entities or industries can be a difficult and cumbersome process.

DETAILED DESCRIPTION

The examples described herein generally configure software applications using semantic maps. Applications can be designed to serve various user groups, entities, industries, etc. Even applications designed for specific purposes, however, can include some features that are not needed by certain users and exclude other features that might be desired by some users.

Some applications (or groups of applications) are designed with customization in mind and provide a number of processes and process components for a user to select. As used herein, "processes" (sometimes referred to as "business processes") refers to processes that can be carried out, managed, documented, tracked, etc., using the application. Example processes include inventory management, procurement, governance, human resources processes, etc., along with more specific process components or sub-processes. Even when applications are customizable and a user specifies desired processes, the processes, process components, or process options chosen by a user may not correspond clearly or directly to actual application functionality, and configuring the application to the user's specifications can be difficult, frequently requiring manual configuration or engagement of a consultant.

The examples described herein configure applications through semantic mapping. A semantic map links some or all of a process and process component to the corresponding configuration objects that are used to implement the processes in the application. Configuration objects can be, for example, settings or parameters. The settings or parameters can control which options, functions, software modules, user interface features, etc. are included in the application and how those functions, modules, and user interface features are customized. Semantic map thus bridge between the process-oriented view of an application and the functional, implementation-oriented view of the application. "Configuration" as used herein can include both selection and incorporation of pre-defined modules or functionality and/or customization of particular features or functions.

Many configuration objects are used in implementing multiple processes, making a simple table-like mapping between processes and configuration objects extremely difficult. The semantic maps used in the described examples, however, are easily established, easily modified, and are bidirectional (allowing identification of configuration objects for processes as well as identification of processes that are implemented using specified configuration objects).

Figure 2:
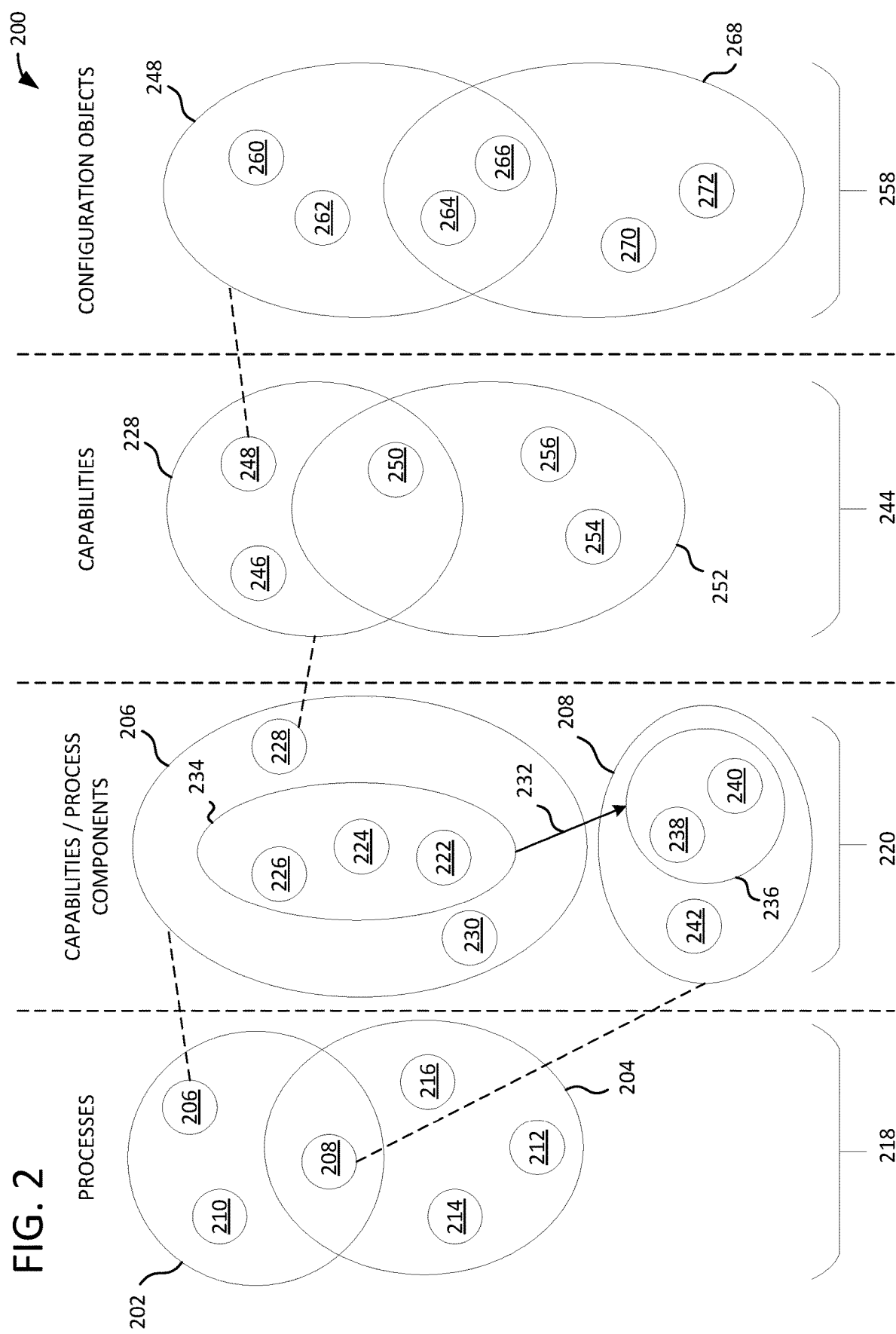
FIG. 2 illustrates example hypergraph-based semantic maps.

As a specific example, semantic maps can be formed from hypergraphs (or corresponding normal graphs). Unlike a normal (or ordinary) graph, in which two nodes (also referred to as vertices) are connected by an edge, in a hypergraph, more than two nodes can be connected by a single edge. Hypergraph-based semantic maps can be formed from multiple layers of hypergraphs—an example of this is shown in FIG. 2. As a particular example, a node of a first hypergraph (e.g., representing an overall process) can be an edge of a second hypergraph (e.g., representing a process component or a capability), and a node of the second hypergraph can be an edge of a third hypergraph, etc. Through this series of edge-node relationships in the different hypergraphs, processes can be linked to configuration objects.

Examples are described below with reference to FIGS. 1-6.

Figure 1:
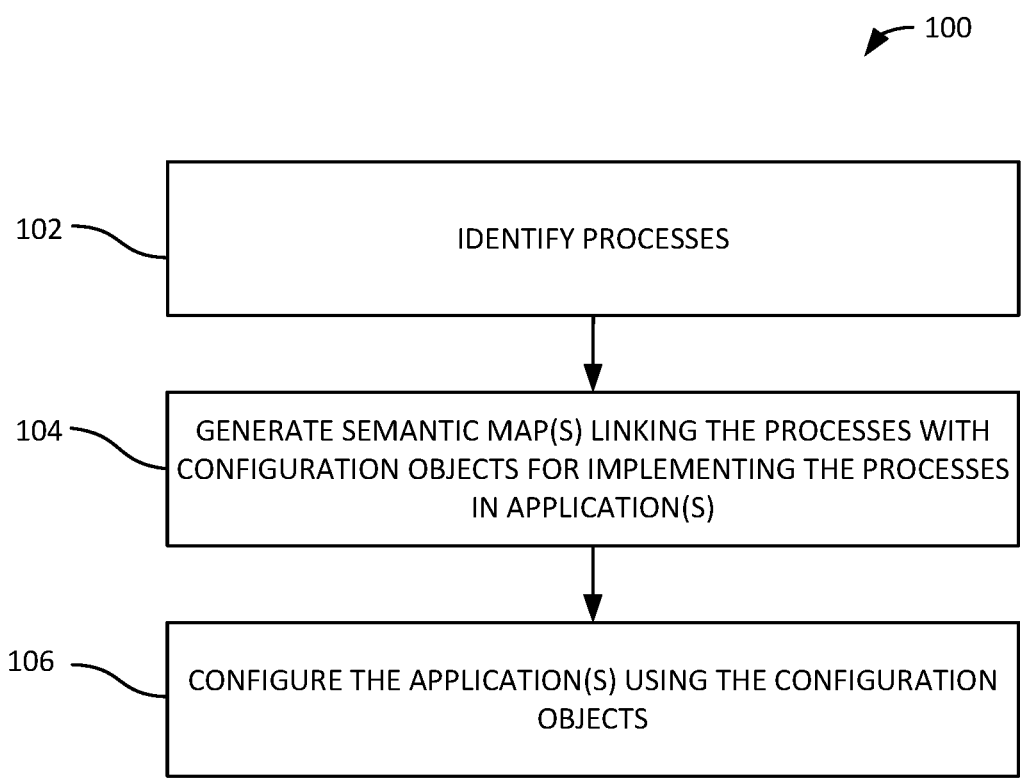
FIG. 1 illustrates an example method of configuring applications in which one or more semantic maps are generated.

FIG. 1 illustrates a method 100 of configuring one or more applications. In process block 102, one or more processes are identified. "Processes" (sometimes referred to as "business processes") refers to processes that can be carried out, managed, documented, tracked, etc., using the one or more applications. Processes can be identified through, for example, user selection through a user interface, determination of needs based on an industry or user categorization (e.g., retailer, wholesaler, manufacturer, etc.), completion of a questionnaire or interactive process, etc.

Example processes include general processes such as inventory management, procurement, governance, human resources processes, etc., along with more specific process components or sub-processes. In some examples, a more general process such as "idea to market" is divided into process components, such as "plan to optimize products/services," "idea to requirements," "design to engineer," "product service to market," and "manage products/services." The respective process components can be further divided into additional process components.

Examples of such a modular process frameworks are the Business Process Framework (eTOM) in the telecommunications industry and the Information Technology Infrastructure Library (ITIL) in information technology. As another specific example of a modular process framework, SAP Reference Business Architecture (RBA) can be used, which is accessible through tools such as SAP Power Designer and SEP Enterprise Architecture Designer (EAD). Such frameworks can define processes and process components in various categories such as service, finance, R&D/engineering, asset management, sales, supply chain, manufacturing, and sourcing and procurement. Such a modular approach allows a user to select processes of different types and at different levels of granularity for inclusion in configuring the one or more applications.

In process block 104, one or more semantic maps are generated linking the processes with configuration objects for implementing the processes in the one or more applications. The configuration objects can be settings or parameters. The settings or parameters can control which options, functions, software modules, user interface features, etc. are included in the application and how those functions, modules, and user interface features are customized. In process block 106, the one or more applications are configured using the configuration objects linked by the one or more semantic maps.

The semantic maps can comprise one or more hypergraphs or normal graphs corresponding to the one or more hypergraphs. A hypergraph is a graph in which one edge (sometimes called a hyperedge) can connect more than two nodes. A single hypergraph can have multiple edges. A hypergraph can also be represented as an equivalent normal graph (e.g., a bipartite graph in which a set of nodes/vertices are one side and edges on the other side).

The semantic map can include multiple layers of hypergraphs (e.g., where each layer is a hypergraph). In such cases, the individual nodes of a hypergraph in one layer can be an edge of a hypergraph in the next layer. In some examples, an edge of a first hypergraph layer represents an overall process scenario (comprising multiple processes) and the nodes of the first hypergraph layer represent different general processes. Each process is an edge in a second hypergraph layer, and process components and/or capabilities are nodes for the second hypergraph layer.

"Capabilities" are functional intermediates that link between processes and configuration objects. Capabilities describe an ability or capacity that a user/entity has to achieve a specific purpose or outcome and can refer to configuration objects. As an example, "lean manufacturing" is a capability that is associated with various processes. The description of lean manufacturing is: "Lean manufacturing involves executing optimal production and material flow using lean control methods and continuous Kaizen improvements to drive timely production. Comprehensive manufacturing and supply chain visibility facilitate improved Kanban processing through lean replenishment for external and internal material flows." The lean manufacturing capability is linked to various configuration objects such as an object for a purchase order and an object for Kanban cycle.

The capabilities that are nodes in the second hypergraph layer can be edges in a third hypergraph layer, and configuration objects can be the nodes of the third hypergraph layer. In this way, the semantic maps link the capabilities to both the processes and configuration objects. An example of hypergraph-based semantic maps with multiple hypergraph layers is shown in FIG. 2.

FIG. 2 illustrates a group of hypergraph-based semantic maps 200. Edges 202 and 204 each represent process scenarios. Nodes 206, 208, and 210 of edge 202 are processes associated with the process scenario represented by edge 202. Similarly, nodes 208, 212, 214, and 216 are processes associated with the process scenario represented by edge 204. Edges 202 and 204 and their corresponding nodes form a first hypergraph, referred to here as a first hypergraph layer 218. An individual semantic map is formed by a starting edge (e.g., edge 202 or 204) and the subsequent edges/nodes linking that starting edge to configuration objects. First hypergraph layer 218 includes two edges, edges 202 and 204, and a semantic map is defined beginning with each edge and ending with the corresponding configuration objects. In some examples, a group of semantic maps can be referred to as "a semantic map" for simplicity.

In a second hypergraph layer 220, nodes from first hypergraph layer 218 are edges. Node 206 is an edge having capabilities 222, 224, 226, 228, and 230 as nodes. Similarly, nodes 210, 212, 214, and 216 from first hypergraph layer 218 are edges (not shown) in second hypergraph layer 220. In some examples, the nodes of second hypergraph layer 220 are process components rather than capabilities.

A directed edge (or directed hyperedge) 232 is formed from input node set 234, containing nodes 222, 224, and 226, and an output node set 236, containing nodes 238 and 240. A directed edge indicates dependencies on other edges/nodes—here the dependency between input node set 234 and output node set 236, shown with a solid line connecting input node set 234 and output node set 236. Edges 202 and 204 are undirected edges, and first hypergraph layer 218 is an undirected hypergraph. Output node set 236 is also part of edge 208 (edge 208 of second hypergraph layer 220 is the same as node 208 of first hypergraph layer 218), which also contains node 242.

Node 228 in second hypergraph layer 220 is an edge in third hypergraph layer 244, the edge containing nodes 246, 248, and 250. Node 250 is also part of edge 252, which further contains nodes 254 and 256. The nodes in third hypergraph layer 244 represent capabilities. Node 248 is an edge in fourth hypergraph layer 258, which contains nodes 260, 262, 264, and 266. Nodes 264 and 266 are also part of edge 268, which further contains nodes 270 and 272. The nodes in fourth hypergraph layer 258 are configuration objects.

FIG. 2 thus illustrates the linkage between application processes, process components, capabilities, and configuration objects. FIG. 2 also illustrates, through the complex linkages and various nodes belonging to multiple edges, the difficulty in representing such relationships in a simple table. Although FIG. 2 shows four hypergraph layers, additional layers (or fewer layers) can also be used. In one particular example, a first layer has processes as nodes, a second layer has capabilities as nodes, and a third layer has configuration objects as nodes. In FIG. 2, each hypergraph layer is one hypergraph.

In FIG. 2, when moving from one hypergraph layer to the next, only one or two examples of a node in the current layer being an edge in the next layer is shown for simplicity. In some examples, additional or all nodes of one layer are edges in the next layer. In some examples, other intermediate structures or functional blocks (other than process components and/or capabilities) are used to link processes and configuration objects.

The relationships between the various nodes and edges shown in FIG. 2 are known to the application provider, and the application provider can establish semantic maps for various process scenarios. Semantic maps (e.g., group of semantic maps 200) can also be referred to as process variant configuration templates. In some examples, semantic maps are generated dynamically after users select processes and options. In other examples, semantic maps are pre-determined and stored in a repository.

Figure 3:
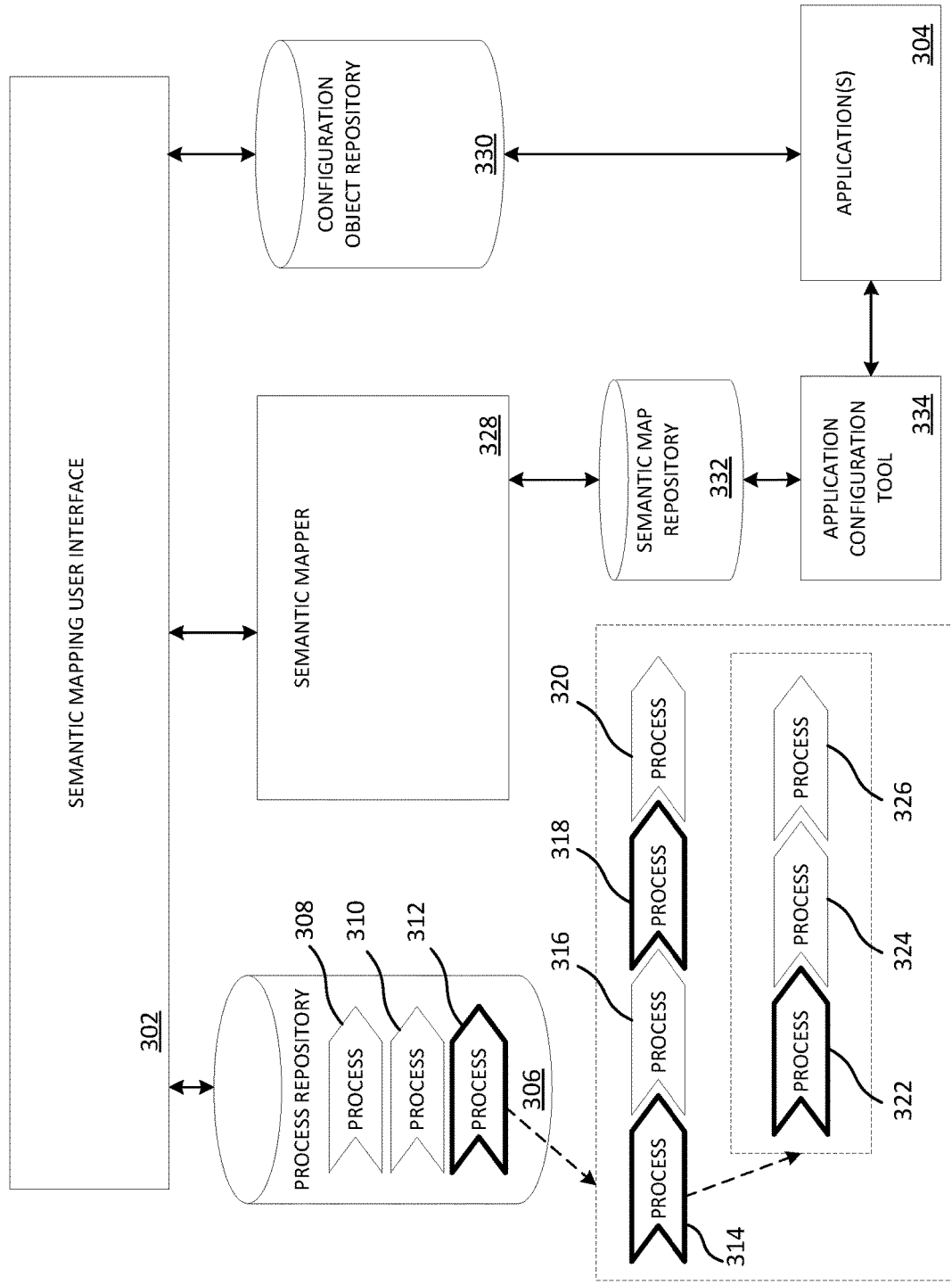
FIG. 3 illustrates an example system for configuring applications using semantic maps.

FIG. 3 illustrates a system 300 for generating semantic maps and configuring applications (cloud or on-premises applications). A user (e.g., a representative of an entity such as a company or other organization) interacts with semantic mapping user interface 302 to identify processes the user would like implemented by or included in one or more application(s) 304. User interface 302 is in communication with process repository 306, which stores processes, including processes 308, 310, and 312. The processes in repository 306 can be modular. In such a system processes 308, 310, and 312 are general processes, and each general process has one or more hierarchical layers of more specific component processes. In FIG. 3, process 312 is shown as having sub-processes or process components 314, 316, 318, and 320, and process 314 is shown as having sub-processes or process components 322, 324, and 326. Processes 312, 314, 318, and 322 are shown bolded to indicate an example selection of those processes from the available processes.

The individual processes and process components and/or the combination of multiple selected processes and process components can be referred to as "process artifacts" or "process objects." Semantic mapper 328 generates a semantic map linking the process artifacts with configuration objects in a configuration object repository 330. The configuration objects can, for example, be objects accessible through the SAP Implementation Guide (IMG) in SAP Enterprise Resource Planning (ERP) framework or the SAP Central Business Configuration (CBC) for cloud applications. Semantic mapper 328 generates semantic maps, such as hypergraph-based semantic maps, and stores the semantic maps in semantic map repository 332. Application(s) 304 can be configured by application configuration tool 334 using the generated semantic maps and configuration objects from configuration object repository 330 identified in the semantic maps. Example semantic maps are illustrated in FIG. 2. Application configuration tool 334 can be integrated into semantic mapping user interface 302 or can be a separate application.

Semantic mapper 328 can perform the semantic mapping through an API or other interface. Which processes and capabilities link with which configuration objects is known or can be determined by the application provider, and this knowledge can be used to construct the semantic map. With reference to FIG. 2, the following example commands generate the first hypergraph layer 218 of FIG. 2:

H=hypergraph{String,String}( )
edge_add (H, "Scenario_PSSP", Set([" MP_206" "MP_208" "MP_210" ])) edge_add (H, "Scenario_LeadToCash", Set(["MP_208" "MP_212" "MP_214" "MP_216]))

Edge 202 represents the "PSSP" process scenario and includes modular processes (MP) 206, 208, and 210. Similarly, edge 204 represents the "LeadToCash" process scenario and includes modular processes 208, 214, 212, and 216. Similar commands can be used to define the remaining hypergraph layers.

After a hypergraph is defined, other commands can be used for bidirectional mapping such as "edges_get (H)" and "nodes_get (H)" to get edges or nodes for a given edge or node. As an example, "edge_get (H, "Scenario_PSSP")" retrieves edges for hypergraph "H" for the process scenario "PSSP."

Figure 4:
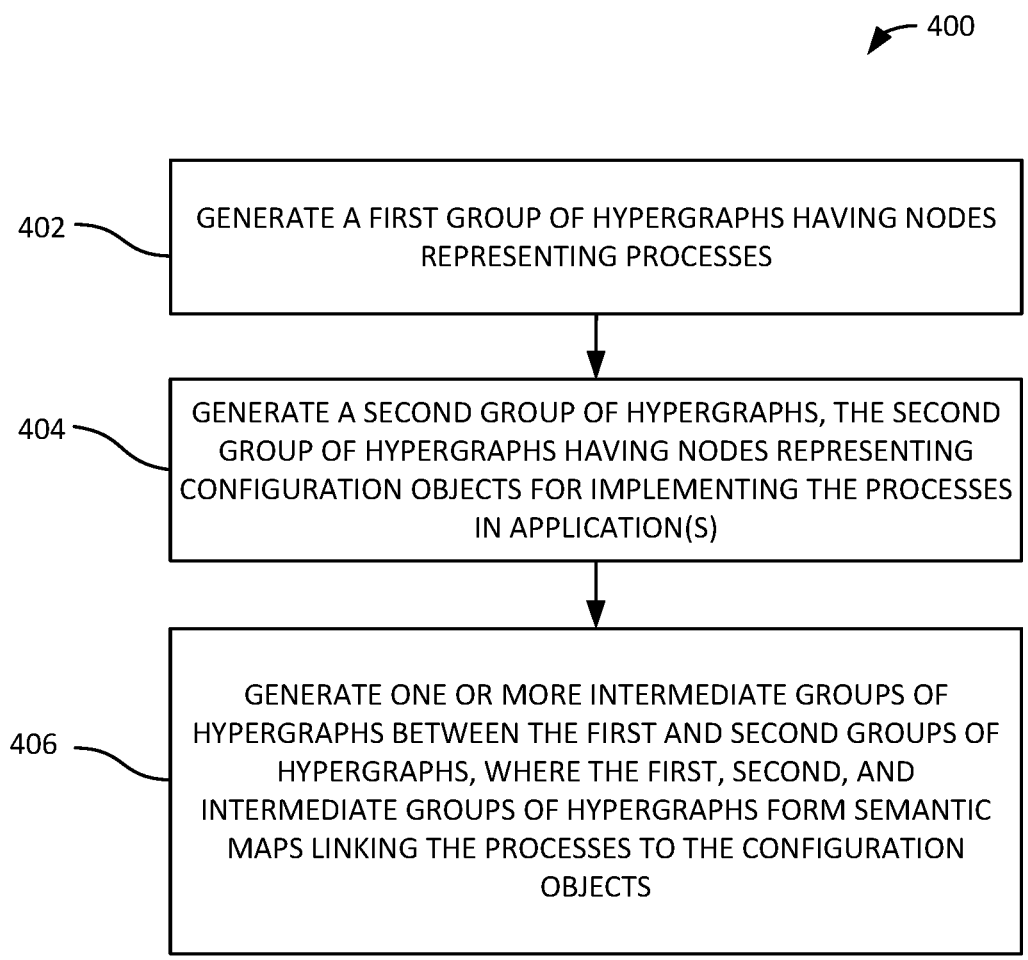
FIG. 4 illustrates an example method of generating semantic maps having multiple hypergraphs.

FIG. 4 illustrates a method 400 of generating semantic maps. In process block 402, a first hypergraph is generated. The first hypergraph has nodes representing processes. In process block 404, a second hypergraph is generated. The second hypergraph has nodes representing configuration objects for implementing the processes in one or more applications. In process block 406, one or more intermediate hypergraphs between the first and second hypergraphs are generated. The nodes of the first hypergraph representing processes are edges for at least one intermediate hypergraph. The nodes of at least one intermediate hypergraph are the edges of the second hypergraph. The first, second, and intermediate hypergraphs form one or more semantic maps linking the processes to the configuration objects. In some examples, method 400 further comprises configuring an application using the semantic map.

Figure 5:
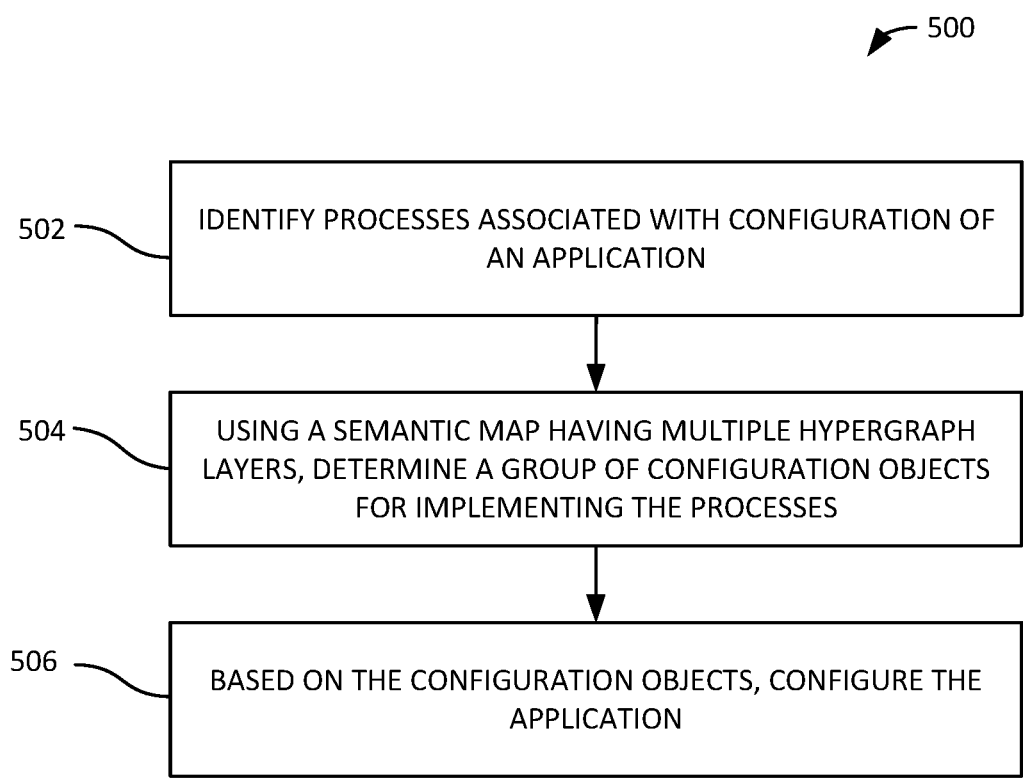
FIG. 5 illustrates an example method of configuring applications using semantic maps having multiple hypergraph layers.

FIG. 5 illustrates a method 500 of configuring an application. In process block 502, processes associated with configuration of an application are identified. In process block 504, using semantic maps having multiple hypergraph layers, a group of configuration objects for implementing the processes is determined. The configuration objects comprise settings or parameters. In process block 506, based on the configuration objects, the application is configured.

Example Computing Systems

Figure 6:
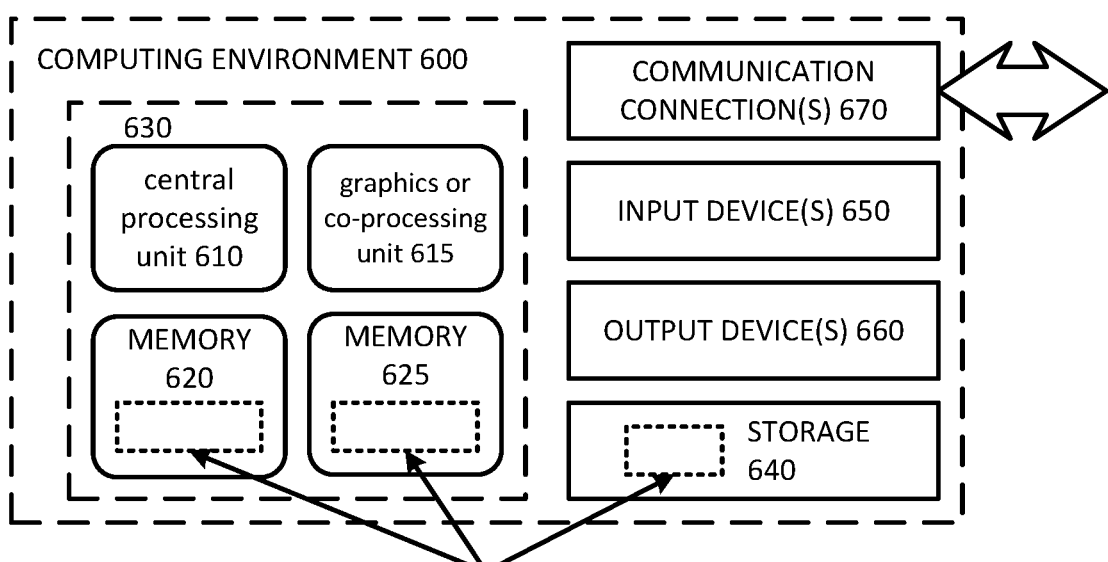
FIG. 6 is a diagram illustrating a generalized implementation environment in which some described examples can be implemented.

FIG. 6 depicts a generalized example of a suitable computing system 600 in which the described innovations may be implemented. The computing system 600 is not intended to suggest any limitation as to scope of use or functionality, as the innovations may be implemented in diverse general-purpose or special-purpose computing systems.

With reference to FIG. 6, the computing system 600 includes one or more processing units 610, 615 and memory 620, 625. In FIG. 6, this basic configuration 630 is included within a dashed line. The processing units 610, 615 execute computer-executable instructions. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 6 shows a central processing unit 610 as well as a graphics processing unit or co-processing unit 615. The tangible memory 620, 625 may be volatile memory (e.g., registers, cache, RAM), non-volatile memory (e.g., ROM, EEPROM, flash memory, etc.), or some combination of the two, accessible by the processing unit(s). The memory 620, 625 stores software 680 implementing one or more innovations described herein, in the form of computer-executable instructions suitable for execution by the processing unit(s). For example, memory 620 and 625 can store semantic mapper 328 of FIG. 3.

A computing system may have additional features. For example, the computing system 600 includes storage 640, one or more input devices 650, one or more output devices 660, and one or more communication connections 670. An interconnection mechanism (not shown) such as a bus, controller, or network interconnects the components of the computing system 600. Typically, operating system software (not shown) provides an operating environment for other software executing in the computing system 600, and coordinates activities of the components of the computing system 600.

The tangible storage 640 may be removable or non-removable, and includes magnetic disks, magnetic tapes or cassettes, CD-ROMs, DVDs, or any other medium which can be used to store information and which can be accessed within the computing system 600. The storage 640 stores instructions for the software 680 implementing one or more innovations described herein. For example, storage 640 can store semantic mapper 328 of FIG. 3.

The input device(s) 650 may be a touch input device such as a keyboard, mouse, pen, or trackball, a voice input device, a scanning device, or another device that provides input to the computing system 600. For video encoding, the input device(s) 650 may be a camera, video card, TV tuner card, or similar device that accepts video input in analog or digital form, or a CD-ROM or CD-RW that reads video samples into the computing system 600. The output device(s) 660 may be a display, printer, speaker, CD-writer, or another device that provides output from the computing system 600.

The communication connection(s) 670 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed and can include any combination of special-purpose hardware and/or general-purpose hardware with software implementing the functionality described herein.

For the sake of presentation, the detailed description uses terms like "determine" and "use" to describe computer operations in a computing system. These terms are high-level abstractions for operations performed by a computer and should not be confused with acts performed by a human being. The actual computer operations corresponding to these terms vary depending on implementation.

Example Implementations

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media and executed on a computing device (e.g., any available computing device, including smart phones or other mobile devices that include computing hardware). Computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example and with reference to FIG. 6, computer-readable storage media include memory 620 and 625, and storage 640. The term computer-readable storage media does not include signals and carrier waves. In addition, the term computer-readable storage media does not include communication connections (e.g., 670).

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology.

We claim:

1. A method of configuring one or more applications, implemented in a computing system comprising a memory and one or more processors, the method comprising:
   identifying one or more processes;
   generating a first hypergraph, the first hypergraph comprising nodes representing the processes;
   generating a second hypergraph, the second hypergraph having nodes representing configuration objects for implementing the processes in one or more applications;
   generating one or more intermediate hypergraphs between the first and second hypergraphs, wherein the nodes of the first hypergraph representing the processes are edges for at least one intermediate hypergraph, and wherein the nodes of the at least one intermediate hypergraph are the edges of the second hypergraph, wherein the first, second, and intermediate hypergraphs form one or more semantic maps linking the processes with configuration objects for implementing the processes in the one or more applications; and configuring the one or more applications using the configuration objects linked by the semantic maps, wherein the configuration objects comprise one or more settings or parameters that control which options, functions, software modules, or user interface features are included in the applications and how the functions, software modules, or user interface features are customized.

2. The method of claim 1, wherein the semantic maps comprise one or more hypergraphs or normal graphs corresponding to the one or more hypergraphs.

3. The method of claim 2, wherein for at least one hypergraph, a node of the hypergraph is an edge of another hypergraph.

4. The method of claim 2, wherein the semantic maps link a plurality of capabilities to both the one or more processes and the configuration objects through the one or more hypergraphs, wherein the plurality of capabilities are functional intermediates between the one or more processes and the configuration objects.

5. The method of claim 4, wherein:
the one or more processes are nodes of a first hypergraph, the nodes of the first hypergraph are edges of a hypergraph having the plurality of capabilities as nodes, and
the plurality of capabilities are edges of a hypergraph having the configuration objects as nodes.

6. The method of claim 1, wherein at least some of the configuration objects are associated with multiple processes.

7. The method of claim 1, wherein the one or more processes, and process components of the processes, are represented by process objects stored in a process object repository.

8. The method of claim 7, wherein the configuration objects are stored in a configuration object repository separate from the process object repository, and wherein the semantic maps link the process objects to the configuration objects.

9. The method of claim 1, wherein the semantic maps are bidirectional, allowing determination of configuration objects that correspond to the one or more processes and determination of other processes that correspond to the configuration objects.

10. A computing system comprising:
memory;
one or more processing units coupled to the memory; and
one or more computer-readable storage media storing instructions that, when loaded into the memory and executed by the one or more processing units, cause the one or more processing units to perform configuration operations for configuring one or more computer-executable applications, the operations comprising:
generating a first hypergraph, the first hypergraph having nodes representing processes;
generating a second hypergraph, the second hypergraph having nodes representing configuration objects for implementing the processes in one or more applications; and
generating one or more intermediate hypergraphs between the first and second hypergraphs, wherein the nodes of the first hypergraph representing processes are edges for at least one intermediate hypergraph, and wherein the nodes of at least one intermediate hypergraph are the edges of the second hypergraph, wherein the first, second, and intermediate hypergraphs form semantic maps linking the processes to the configuration objects, wherein the configuration objects comprise one or more settings or parameters that control which options, functions, software modules, or user interface features are included in the applications and how the functions, software modules, or user interface features are customized.

11. The system of claim 10, wherein the one or more intermediate hypergraphs relate capabilities to the processes and configuration objects, and wherein the capabilities are functional intermediates between the processes and the configuration objects.

12. The system of claim 10, wherein one or more of the first, second, or intermediate hypergraphs includes multiple edges.

13. The system of claim 10, wherein a first and second intermediate hypergraph are generated, and wherein the nodes of the first hypergraph are edges of the first intermediate hypergraph, wherein nodes of the first intermediate hypergraph are edges of the second intermediate hypergraph, and wherein nodes of the second intermediate hypergraph are edges of the second hypergraph.

14. One or more computer storage devices comprising computer-executable instructions that, when executed, cause a computing system programmed thereby to perform configuration operations for configuring one or more computer-executable applications, the operations comprising:
identifying a plurality of processes associated with configuration of an application;
generating a first hypergraph, the first hypergraph having nodes representing the processes;
generating a second hypergraph, the second hypergraph having nodes representing configuration objects for implementing the processes in one or more applications;
generating one or more intermediate hypergraphs between the first and second hypergraphs, wherein the nodes of the first hypergraph representing processes are edges for at least one intermediate hypergraph, and wherein the nodes of at least one intermediate hypergraph are the edges of the second hypergraph, wherein the first, second, and intermediate hypergraphs form semantic maps linking the processes to the configuration objects;
using the semantic maps, determining a group of configuration objects for implementing the processes, the configuration objects comprising one or more of settings or parameters; and
based on the configuration objects, configuring the application, wherein the settings or parameters control which options, functions, software modules, or user interface features are included in the applications and how the functions, software modules, or user interface features are customized.

15. The computer storage devices of claim 14, wherein the semantic maps are bidirectional, allowing determination of configuration objects that correspond to the processes and determination of other processes that correspond to the configuration objects.

16. The computer storage devices of claim 14, wherein at least some hypergraphs in the semantic maps are directed hypergraphs.

17. The computer storage devices of claim 14, wherein the processes and process components are represented by process objects stored in a process object repository, wherein the configuration objects are stored in a configuration object repository separate from the process object repository, and wherein the semantic maps link the process objects to the configuration objects.

* * * * *